United States Patent [19]

Hoffman

[11] 4,445,716
[45] May 1, 1984

[54] DEVICE AND METHOD FOR ANCHORING AN END OF A PLASTIC LINER INSIDE A PIPE

[75] Inventor: Joseph W. Hoffman, Liverpool, Pa.

[73] Assignee: AMP Incorporated, Harrisburg, Pa.

[21] Appl. No.: 371,831

[22] Filed: Apr. 26, 1982

[51] Int. Cl.³ .......................... F16L 9/14; F16L 55/00
[52] U.S. Cl. ...................................... 285/55; 285/39; 285/382.4; 285/258; 285/347
[58] Field of Search .................. 285/55, 15, 39, 382.4, 285/258, 351, 347, 331, 242, 256; 138/97, 98

[56] References Cited

U.S. PATENT DOCUMENTS

| | | | |
|---|---|---|---|
| 714,671 | 12/1902 | Clark | 138/98 |
| 2,433,425 | 12/1947 | Burckle | 285/258 X |
| 2,756,779 | 7/1956 | Tratzik et al. | 285/382.4 X |
| 3,479,059 | 11/1969 | Taylor et al. | 285/55 |
| 3,578,360 | 5/1971 | Eliot | 285/55 |
| 4,377,945 | 3/1983 | Di Giovanni | 138/97 X |

*Primary Examiner*—Richard J. Scanlan, Jr.
*Attorney, Agent, or Firm*—Allan B. Osborne

[57] ABSTRACT

The present invention relates to a device and method for lining a steel or iron service pipe with a plastic liner and securing an end of the plastic liner to the inside surface of the service pipe. More particularly, the device includes an expanding means removably attached to a hydraulic operated piston, and a plastic sleeve crimped to one end of the plastic liner. The piston forces the expander into the sleeve to deform the sleeve out against the service pipe.

4 Claims, 4 Drawing Figures

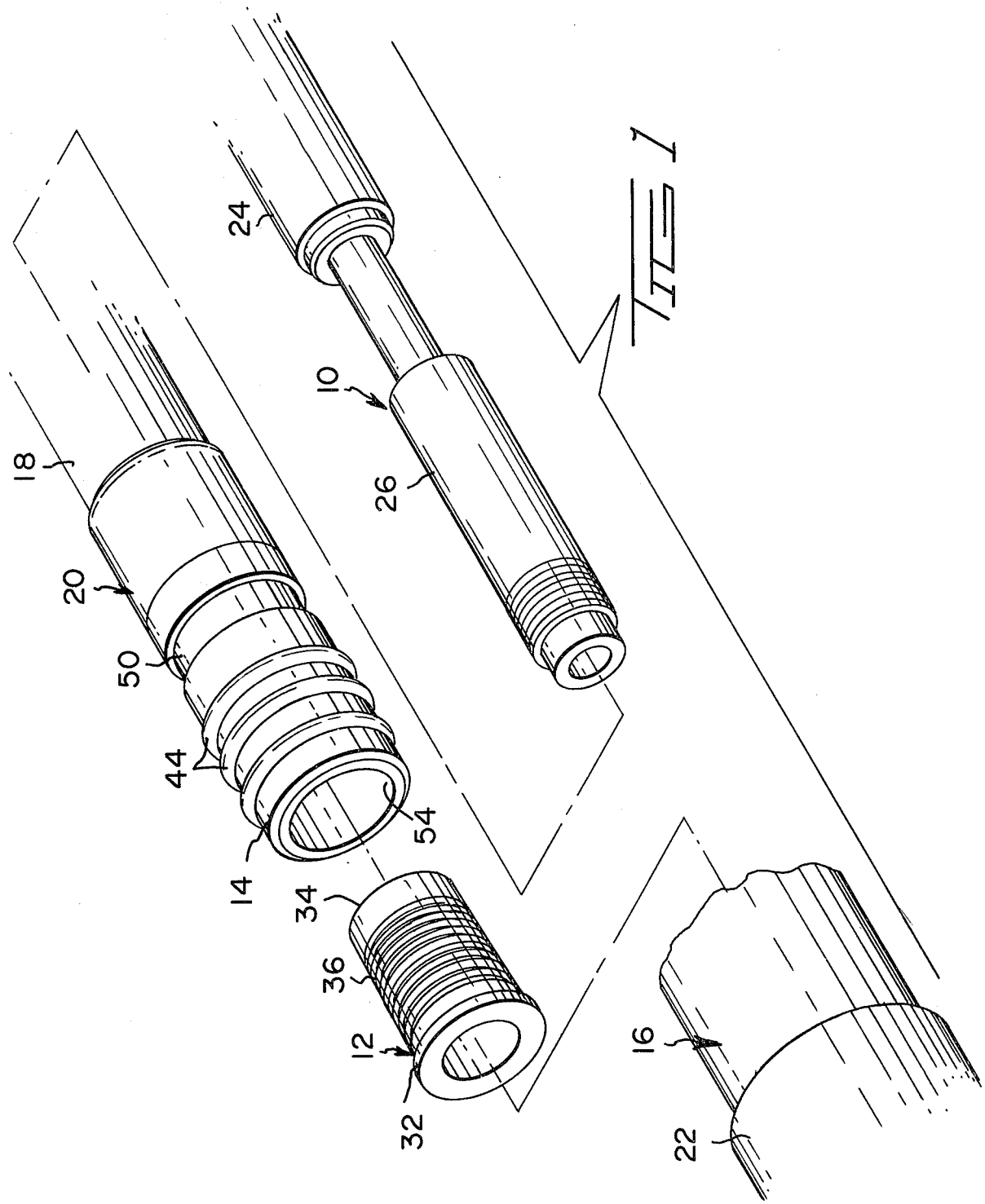

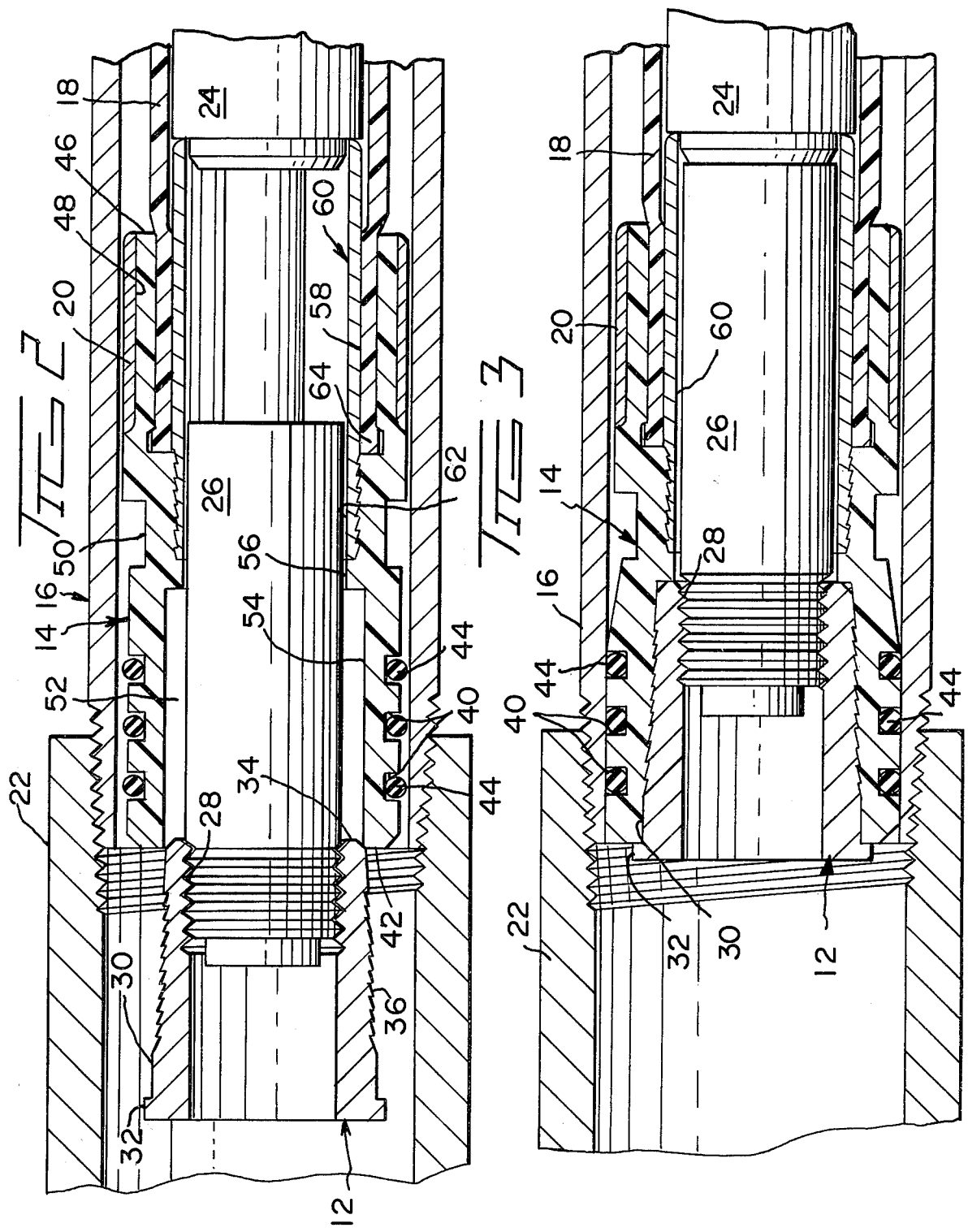

DEVICE AND METHOD FOR ANCHORING AN END OF A PLASTIC LINER INSIDE A PIPE

BACKGROUND OF THE INVENTION

1. The Field of the Invention

Devices and methods for anchoring a free end of a plastic liner to the inside surface of a metal pipe.

2. The Prior Art

Heretobefore, whenever a service pipe is needed to be lined with plastic, a hole was dug in the street to uncover the service tee which connects the service pipe to the main supply line. The connection between the tee and service pipe was cut so that the plastic liner could be inserted into the service pipe and attached to the service tee by means of bolted flanges or the like. Such remedial work required blocking off the street or channeling traffic around the work site creating a potential for accidents.

SUMMARY OF THE INVENTION

The present invention is a device which includes a sleeve, means for attaching a plastic liner to one end of the sleeve and expanding means for expanding the other end of the sleeve against the inside surface of the pipe in which the plastic liner is placed. The expanding means is preferably left in the sleeve to prevent sleeve relaxation.

BRIEF DESCRIPTION OF THE DRAWINGS

FIG. 1 is a perspective view of the plastic liner, the sleeve attached thereto, the sleeve expanding member, the tool, the service pipe which is to be lined, and the service tee;

FIG. 2 is a cross-sectional view of the components of FIG. 1 assembled and positioned within the service pipe at a remote location several feet in from where the plastic liner was inserted;

FIG. 3 is a cross-sectional view of the assembly of FIG. 2 after the tool has secured the sleeve to the service pipe.

DESCRIPTION OF THE INVENTION

Figure 4:
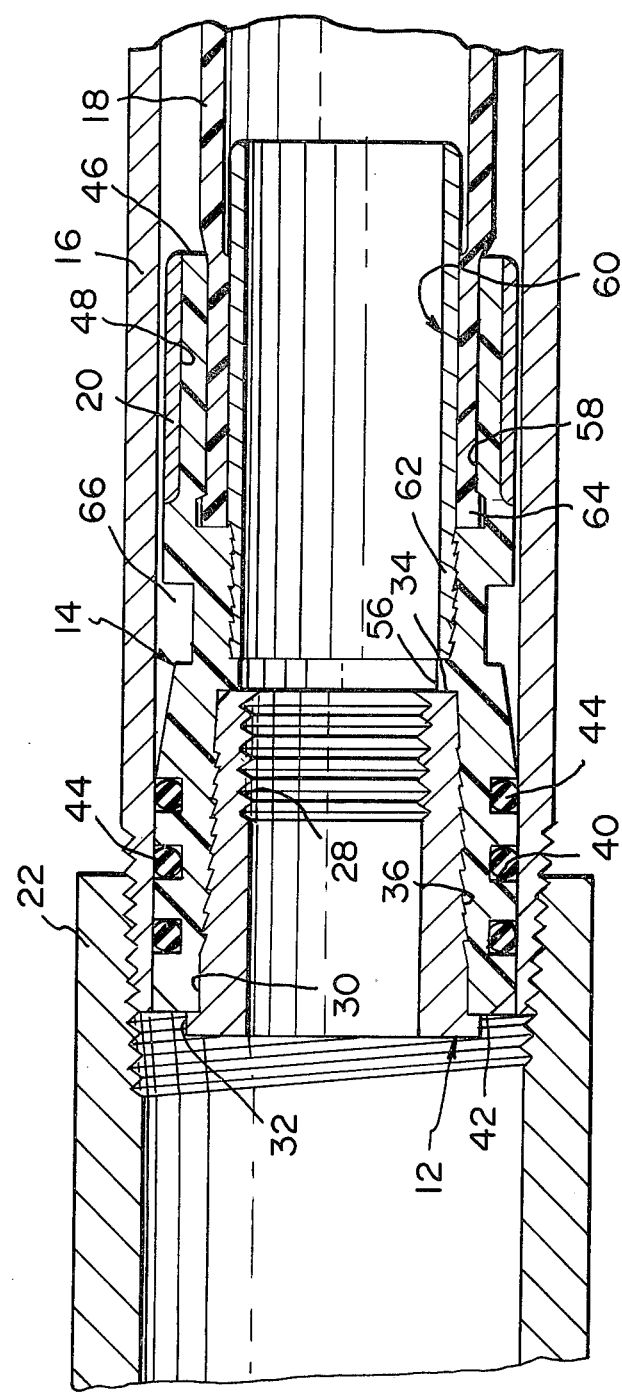
FIG. 4 is a cross-sectional view of the assembly of FIG. 3 after the tool has been removed from the now lined service pipe.

FIG. 1 illustrates tool 10 which is used to drive expanding member 12 into sleeve 14 to force it outwardly against the inside surface of service pipe 16. The sleeve is attached to plastic liner 18 by crimping the two together with ferrule 20.

The section of service pipe 16 shown is at the point where it is threadedly attached to service tee 22 at a main pipe line (not shown).

FIG. 2, which shows the components in greater detail, is a cross-sectional view at the vicinity where service pipe 16 is threaded into service tee 22. This location may be up to eight feet in from the point where pipe 16 has been cut into to insert plastic liner 18.

Tool 10 is a conventional, hydraulically operated device having a power cylinder 24 and a reciprocating piston 26. The free end of the piston is threaded as indicated by reference numeral 28.

Expanding member or simply expander 12 is a hollow, steel tube with the outer surface 30 tapered inwardly from a flanged end 32 to the opposite end 34. A series of teeth 36 are provided around the outer surface intermediate the ends. Threads 38, mateable with threads 28, are provided on the inside surface of the tube adjacent end 34 so that the expander can be threadedly attached to piston 26 as shown.

Sleeve 14 is preferably made from a plastic material which can be permanently deformed, i.e., not resilient. Molding nylon is one such material.

Three circumferential grooves 40 are provided on the outer surface of the sleeve adjacent first end 42. O-rings 44 are positioned in these grooves.

A reduced outer diameter is provided adjacent the second end 46 of the sleeve onto which ferrule 20 is to be placed. The surface of the reduced outer diameter section, indicated by reference numeral 48, may have one or more circumferential teeth (not shown) which cooperates with ferrule 20 in crimping that end of the sleeve inwardly. Such crimping features and techniques are disclosed in U.S. Pat. No. 3,674,292.

A wide groove 50 encircles sleeve 14 midway between the two ends. The groove is used in conjunction with a tool (not shown) in pulling ferrule 20 onto section 48.

The passage 52, extending through sleeve 14, includes a first section 54, second section 56 of reduced inner diameter, and third section 58, substantially underlying reduced outer diameter section 48. A hollow, metal cylindrical insert 60 is part of sleeve 14 with one end 62 molded into the second section 56 wall. The insert extends through third section 58 of the passage and out second end 46 of the sleeve. Preferably, insert 60 is made from steel and plated with tin.

Third section 58 of passage 52 and insert 60 define therebetween an annular space which receives a free end 64 of plastic liner 18.

Ferrule 20 is a ring of substantial width and is made from a metal such as type 316 stainless steel. The internal diameter is slightly less than the diameter of reduced outer diameter section 48 on sleeve 14.

As is well known, a main pipe line (not shown) is generally buried below the surface of a street. Service pipe line 16, connected to the main pipe line through tee 22, extends from the main pipe line to a dwelling or other type building. A method for lining pipe 16 with plastic liner 18 without digging a hole in the street to reach tee 22 has heretobefore been unavailable for the reason that there was no way to remotely anchor the free end of the plastic liner to the inside surface of the pipe adjacent the threaded connection between the tee and pipe 16. The threaded connection point, being under the street, would be some distance from a location off the street where a hole could be conveniently dug. With the present invention, the hole can be dug away from the street and the service pipe lined with plastic. The method includes the following steps.

A hole is dug down to the service pipe 16 approximately eight feet from the service tee 22. This location is well away from the street and has no disrupting effect on automobile and pedestrian traffic. A section of pipe 16 is removed to provide an opening to accommodate inspection and cleaning tools (not shown). The inside surface of pipe 16 is deburred, reamed, cleaned, and inspected from the opening back to tee 22.

Thereafter plastic line 18 is cut to provide a length long enough to extend from the opening back to the tee.

Next sleeve 14 is fixed to the free end of liner 18 by first sliding ferrule 20 onto the liner and then inserting free end 64 into the annular space between insert 60 and the wall of third section 58 of passage 52. Using one of the tools sold by AMP Incorporated, Harrisburg, Pa., under the trademark AMP-FIT hand tool, ferrule 20 is pushed onto reduced diameter section 48, causing that section to be crimped or compressed inwardly to reduce the annular space. The section of plastic liner within the annular space is thereby tightly gripped and cannot be pulled out.

Tool 10, with a sufficient length of flexible hydraulic hose (not shown) connected to cylinder 24, is inserted into liner 18 from the end opposite the free end attached to sleeve 14 and pushed through the liner until cylinder 24 abuts the free end of insert 60. The threaded end of piston 26 just sticks out of the sleeve at first end 42. Expander 12 is threaded onto the piston up to where end 34 thereon abuts sleeve end 42.

The assembly is complete and is now fed into service pipe 16 until the assembly is positioned at the service tee 22/service pipe 16 connection as shown in FIG. 2.

Tool 10 is now actuated so that piston 26 is pulled towards cylinder 24. Expander 12 is thusly pulled into the first section of passage 52, causing that end of the sleeve to be expanded outwardly against the inside surface of pipe 16. The expander lines the length of first section 54 of passage 52 with flanged end 32 abutting sleeve end 42 and end 34 abutting the shoulder defining the boundary between first section 54 and second section 56 of passage 52.

Tool 10 is then unscrewed and withdrawn from the now plastic-lined service pipe. FIG. 4 is a cross-sectional view identical to FIG. 3 except with tool 10 removed. O-rings 44 and the expanded sleeve end prevents fluid from leaking into space 66 between service pipe 16 and plastic liner 18.

Teeth 36 on the outer surface of expander 12 prevent the expander from backing out of passage 52.

The sleeve is held so tightly against the inside surface of service pipe 16 that it would take abnormally high pressures to dislodge it.

The present invention has been described as being used near a connection with a service tee at a location remote from where the plastic liner is inserted into the pipe. However, it can be used anywhere; e.g., to line a section of pipe which has been excessively corroded and is leaking. One advantage of the present invention is that a length of service pipe can be lined through one opening thereinto and the liner anchored to the inside surface of the pipe at a location several feet in from that opening.

The present invention may be subjected to many modifications and changes without departing from the spirit or essential characteristics thereof. For example, the sleeve may be positioned in an open end of the pipe such that the expander 12 can be driven into the first end of the sleeve passage by means of a hammer. The present embodiment is therefore intended in all respects as being illustrative and not restrictive of the scope of the invention.

I claim:

1. A device for anchoring an end of a plastic liner to the inside surface of a pipe, the device comprising:
   a. an elongated sleeve having first and second ends and a passage therethrough;
   b. means for attaching a plastic liner to the second end of the sleeve; and
   c. a hollow rigid tube with a tapered outer surface having teeth thereon for being forced into the passage at the first end of the sleeve to expand that end against the inside surface of a pipe in which the sleeve may be positioned and with the teeth biting into the passage wall to hold the tube in the passage.

2. The device of claim 1 further including latching means on the inside surface of the tube for removably latching the tube to means adapted for forcing the tube into the sleeve passage.

3. The device of claim 2 wherein the means for attaching a plastic liner to the second end of the sleeve includes a tubular insert of rigid material having one end attached to the wall of the passage and extending through the passage out to at least the second end of the sleeve, the diameters of the insert and passage adjacent the second end being such as to define an annular space for receiving a free end of the plastic liner, and means for compressing the sleeve into the annular space to confine the free end which may be positioned therein.

4. The device of claim 3 wherein the means for compressing the sleeve includes a ferrule.

* * * * *